W. H. CALLAHAN.
ADDING MACHINE.
APPLICATION FILED FEB. 6, 1909.

978,111.

Patented Dec. 6, 1910.
3 SHEETS—SHEET 1.

WITNESSES:

INVENTOR
William H. Callahan
BY Munn & Co
ATTORNEYS

W. H. CALLAHAN.
ADDING MACHINE.
APPLICATION FILED FEB. 6, 1909.

978,111.

Patented Dec. 6, 1910.
3 SHEETS—SHEET 2.

WITNESSES:

INVENTOR
William H. Callahan
BY
ATTORNEYS

W. H. CALLAHAN.
ADDING MACHINE.
APPLICATION FILED FEB. 6, 1909.
978,111.
Patented Dec. 6, 1910.
3 SHEETS—SHEET 3.
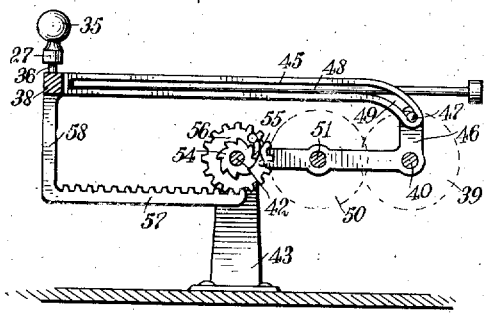
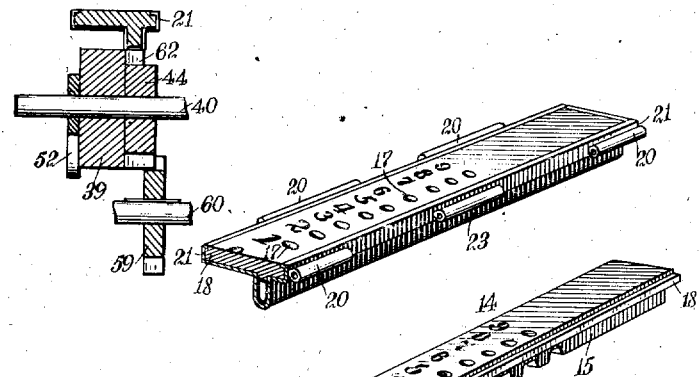
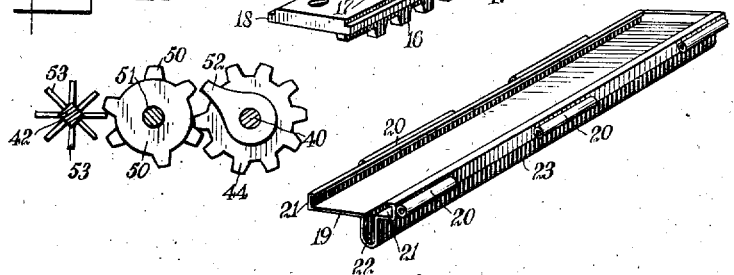
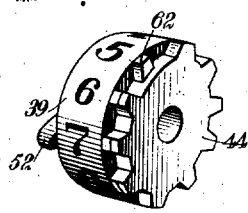
WITNESSES:
INVENTOR
William H. Callahan
BY
ATTORNEYS

UNITED STATES PATENT OFFICE.

WILLIAM H. CALLAHAN, OF UTICA, NEW YORK.

ADDING-MACHINE.

978,111.  Specification of Letters Patent.  Patented Dec. 6, 1910.

Application filed February 6, 1909. Serial No. 476,353.

*To all whom it may concern:*

Be it known that I, WILLIAM H. CALLAHAN, of Utica, in the county of Oneida and State of New York, have invented certain new and useful Improvements in Adding-Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

This invention relates to improvements in adding machines, and has for its principal object to provide a mechanism to automatically and accurately form and display results in total form of the addition of various numbers when same are successively indicated on the machine.

Among the further objects of the present invention are: to provide a machine compact in form and light in weight; to provide a machine the mechanism whereof is simple, durable and economical in construction; and to provide a machine wherein the parts may be returned to the initial or zero condition rapidly and simply.

One embodiment of the present invention is disclosed in the structure illustrated in the accompanying drawings, in which like characters of reference denote corresponding parts in all the views, and in which—

Figure 1:
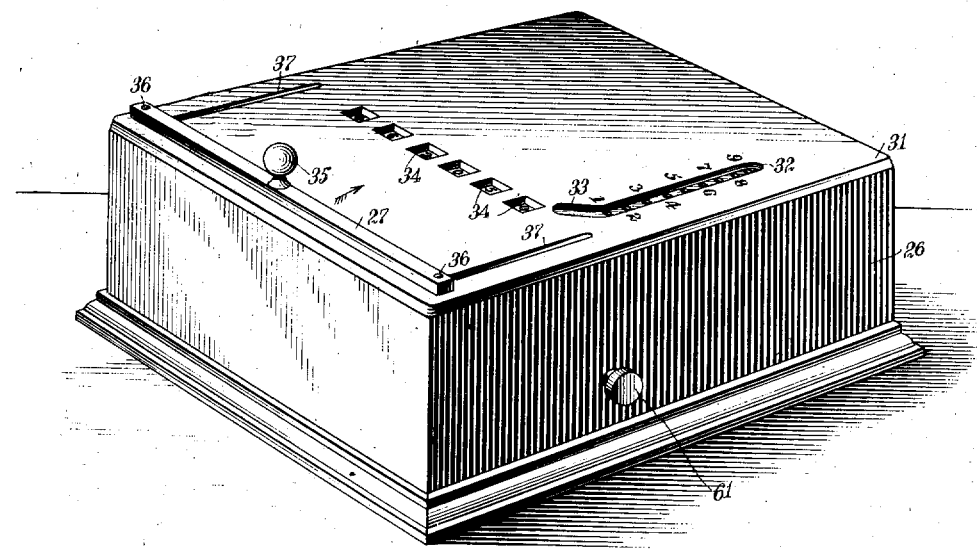
Figure 2:
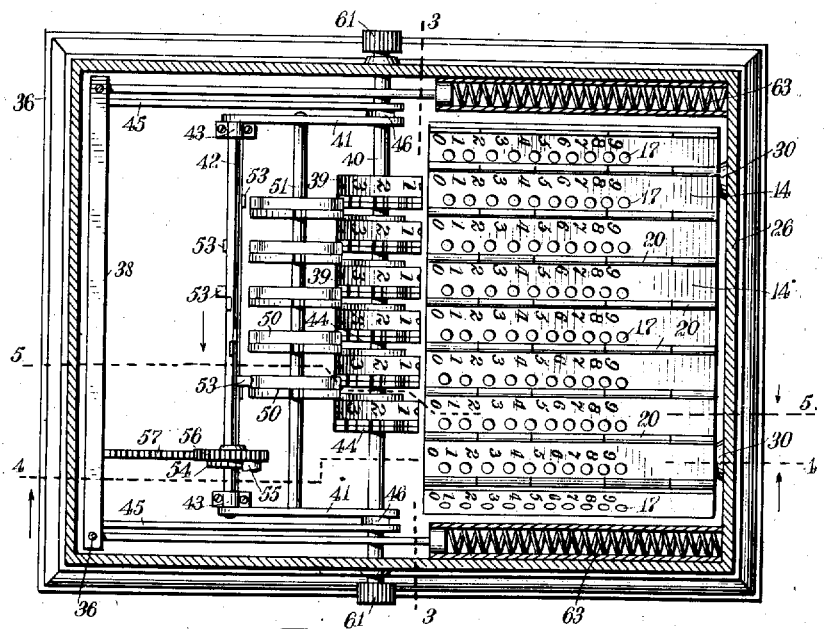
Figure 3:
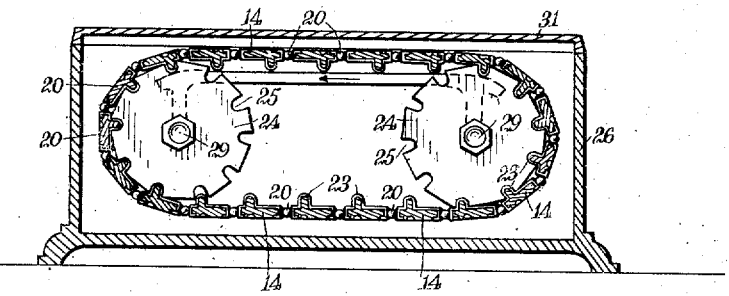
Figure 4:
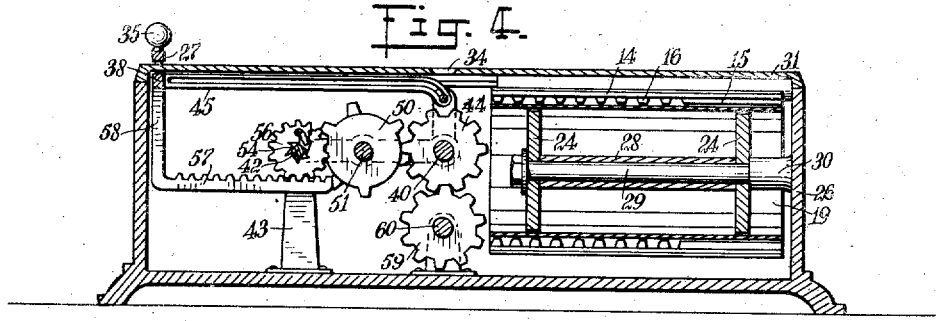
Figure 5:
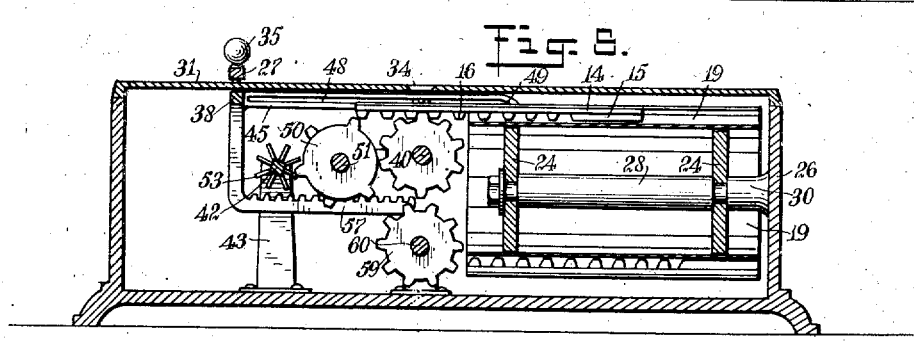
Figure 6:
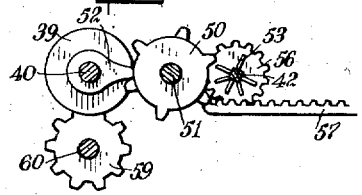

Figure 1 is a perspective view of an adding machine constructed and arranged in accordance with the present invention; Fig. 2 is a horizontal section of the machine showing the mechanism below the top of the containing casing in plan; Fig. 3 is a cross section of the machine taken on the line 3—3 in Fig. 2; Fig. 4 is a cross section of the machine taken on the line 4—4 in Fig. 2; Fig. 5 is a cross section of the machine taken on the line 5—5 in Fig. 2; Fig. 6 is a detail view in elevation of the registering wheels of the machine shown in conjunction with the carrying wheel and mechanism for operating the same, and also the resetting wheels; Fig. 7 is a detail view in side elevation of the reciprocating operating frame with which this machine is provided; Fig. 8 is a detail view on an enlarged scale showing in vertical section a register wheel, and in conjunction therewith a computator bar and a wheel of the resetting mechanism; Fig. 9 is a detail view in isometric perspective of a conveyer link shown in conjunction with a computator bar mounted therein; Fig. 10 is a detail view in isometric perspective of a computator bar constructed in accordance with the present invention; Fig. 11 is a detail view in isometric perspective of a link of the conveyer for the computator bars; Fig. 12 is a detail view in perspective on an enlarged scale, showing one of the register wheels and the toothed wheel therefor; and Fig. 13 is a diagrammatic view in side elevation illustrating the action of the wheels of the carrying mechanism of the registering wheels.

The instrumentalities shown in the accompanying drawings may be divided into three distinct groups, to wit, the computing mechanism, the registering mechanism and the resetting mechanism. The various groups coöperate successively to, first, selectively arrange the number to be added and in column form; second, to add the said number to the column total; and, third, to reset the registering mechanism to arrange the elements thereof in their initial position.

The group of instrumentalities constituting the computing mechanism consists primarily in a plurality of selecting bars 14. The bars 14 are shaped substantially as shown in Fig. 10 of the drawings, and are provided with a depending flange 15, the forward or outer end whereof is provided with a series of teeth forming a rack 16. The upper surface of the bars 14 is provided with a series of indentations 17, 17, deep enough to receive in holding relation the point of a pencil or stylus. It is by means of the indentations 17, 17 that the bars 14 are engaged and shifted as per the selection. Arranged in series order by the side of the said indentations are numerals from zero to nine. The indentations and the numerals disposed at the side thereof, bear fixed relation with the teeth of the rack 16, for reasons which will be hereinafter more fully set forth. The bars 14 are provided with lateral flanges 18, 18, which guide the same in their operation.

The bars 14 are supported in elongated link members 19. The link members, when joined, constitute an endless belt conveyer, the connection between the links being formed by hinged extensions 20, 20. The links 19 are provided with edge slots, 21, 21, into which are extended the flanges 18, 18 to slide therein in guided relation. The depended flange 15 of the bars 14 extends into a groove 22 formed in the under side of the link members 19.

The endless chain formed by the links 19 when joined shows a series of inwardly projected tooth-like members, in which are formed the grooves 22. The conveyer is supported by wheels 24, 24, in the periphery of which are formed recesses 25, 25 arranged and adapted to receive the projections 23, 23 of the said conveyer. The conveyer is disposed in lateral arrangement in a casing 26, as shown in Fig. 2 of the drawings. The conveyer is also mounted on the rear end of the said casing, or on the end removed from an operating bar 27. (See Fig. 1 of the drawings.) The wheels 24, 24 are united by a sleeve 28 in fixed relation to preserve the uniformity of action, as of a drum, and by means of the elongated form of the sleeve to provide a bearing for a shaft 29. The shaft 29 is extended from a stud 30 rigidly connected to the casing 26 of the machine. The wheels 24, 24 are idlers, turning only when in the operation the conveyer is shifted to the left, as shown by the arrow in Fig. 3 of the drawings, which is the direction followed by the said conveyer in the usual operation of the machine.

The cover 31 of the casing 26 is provided with a slot having two extensions 32 and 33. The conveyer is so disposed that the indentations 17 of the various bars normally pass under and in line with the extension 32 of the said slot. The extension 33 of the said slot is inclined, as shown in Fig. 1 of the drawings. The length of the extension is such that when an indentation of each of the bars is engaged in the elongated extension 32 and moved to the bottom of the extension 33, the conveyer carrying all of said bars is shifted one link in its movement to the left, as seen in Fig. 3. It is by this arrangement that the conveyer is moved in its path. The cover 31 is further provided with a series of openings 34, 34, arranged in parallel position, as shown in Fig. 1 of the drawings. The openings 34, 34 are provided to view the selective arrangement of the bars 14 in setting up the number to be added to the then known total. As will hereafter be seen, the same openings serve to view the registered total.

The first operation of the machine is that employing the conveyer, the selective bars 14, the slot extensions 32 and 33 and the openings 34, 34, as it is by means of these instrumentalities that the number to be added is set up. The operation is as follows: Assuming that the number to be added is 345, the operator inserts the end of a pencil or stylus in the indentation showing in the extension 32 opposite the numeral 3 of the set of numerals formed around the edge of the said extension 32. Having engaged the indentation showing the numeral 3, the operator draws the bar 14 with which he is thus engaged, until his pencil or stylus is arrested at the extreme bottom of the extension 33. By reason of the inclined position of the extension 33, when the stylus is brought in contact with the slanting wall thereof, it is compelled to travel laterally as well as downwardly. The lateral travel moves the bar 14 thus engaged, and the conveyer connected therewith, one position to the left, or in the line of travel indicated by the arrow in Fig. 3. In this position it will be found that the indentations in the bar 14 set opposite the numeral 4 in the said bar (which is the identation that rested opposite the numeral 3 in the extension 32) rests at the lower end of the extension 33, while the numeral 3 on the said bar 14 is centrally disposed with reference to the first of the openings 34. In this position the adjusted bar 14 remains until, as hereinafter described, it is reset to its normal position within the link 19 to which it belongs. Having thus set the first numeral of the number desired, the operator places the stylus in the indentation set opposite the numeral 4 on the edge of the extension 32, which now appears in line with the said extension. The operation of drawing this second bar 14 downwardly and laterally is repeated, with the result that the numeral 4 appears at the first of the squared openings 34, while the numeral 3, and the first bar 14 carrying the same, has been moved laterally to the left and is exposed through the second of the series of openings 34. In the latter case the indentation opposite the numeral 5 in the bar 14 last set remains at the bottom of the extension 33, and the conveyer has been shifted so that the succeeding bar 14 is presented under the extension 32. The last, and final, numeral 5 is to be brought down, and this is accomplished by placing the stylus in the indentation set opposite the numeral 5 on the extension 32, and the third bar 14 is drawn down until the numeral 5 of the third bar is exposed in the first of the openings 34, while, by reason of the movement of the conveyer, the bars which have been previously adjusted to expose the numerals 3 and 4 are disposed in line with the second and third of the said openings 34. In this position it is found that the number desired to be added to the total, to wit, 345, is exposed in proper order in line with the openings 34, 34. In this position the number 345 is added to the previous total by the operation of shifting the bar 27 backward in the direction of the arrow shown in Fig. 1 of the drawings. To shift the bar 27, the operator engages a handle 35 and pushes thereon until the rods 36, 36 connecting the bar 27 with the interior mechanism are arrested at the free end of the slots 37, 37.

In the operation as above set forth, it will be seen that the extension forwardly of the various bars 14 has differed. Each of the bars has been advanced in proportion to the magnitude of the number which it has been employed to expose. The several bars are maintained in position in the path of an adjusting bar 38, which is connected by means of the rods 36, 36 with the bar 27. When now the bar 27 is moved toward the openings 34, 34, as above described, the bar 38 impinges upon the several bars 14 in succession and according as they are more or less extended. When the rods 36, 36 are arrested at the ends of the slots 37, 37, the bar 38 has reset all of the extended bars 14 in their normal position in the links 19, 19. In thus resetting the bars 14, 14, the registering mechanism has been operated to add the number to the former total, which number has been selectively engaged in the manner as above set forth.

The registering mechanism consists of a series of wheels 39, 39. The wheels 39 are loosely but snugly mounted on a fixed shaft 40, and are spaced in set relation each to the other. The number of wheels 39 may vary according to the needs and capacity of the machine, as required. The fixed shaft 40 is suspended in the ends of swinging arms 41, 41. The arms 41, 41 are pivotally mounted on round extensions of a shaft 42, or, if preferred, in pivots formed in standards 43, 43. The wheels 39 are divided on the periphery into ten equal spaces, and each space is provided with a numeral in serial order ranging from zero upward to nine. Fixedly mounted on the side of each of the wheels 39 is a ten-toothed cog wheel 44. The cog wheels 44 are related to the numerals on the periphery of the wheels 39 in the same lateral separation as are the racks 16 with relation to the numerals carried by each of the bars 14. In the various adjustments of the conveyer formed by the links 19, each of the bars 14 are so disposed that the teeth in the racks 16 are alined with the teeth in the cog wheels 44, and this in the retracted as well as the projected position of the said bars 14.

The arms 41, 41 carrying the shaft 40 and the wheels 39, 39 are suspended from slotted arms 45, 45 by means of extensions 46, 46, and pins 47 provided in the ends of the said extensions. The pins 47 are extended into a slot 48 with which each of the arms 45 is provided. In the normal position, which is that assumed when the bar 38 is outwardly disposed, and as shown in Fig. 7 of the drawings, the shaft 40 and wheels 39 carried thereon are removed from contact with the racks 16 of the bars 14, as seen in Figs. 4 and 7 of the drawings. In this position the pin 47 rests in the lower end of the inclined section 49 of the arms 45. When, however, in the operation of the machine, the bars 27 and 38 are advanced, the pins 47 are forced by the incline of the slot section 49, thereby lifting the shaft 40 and wheels 39, and bringing the teeth of the cog wheel 44 into engagement with the teeth of the racks 16 which have been selectively drawn out and adjusted in the manner above set forth. There is sufficient play in the movement of the bars 27 and 38, to insure the lift of the wheels 39 to toothed engagement with the racks 16 before the bar 38 strikes upon the farthest advanced of the said bars 14. Hence, when the bars 14 are impinged upon by the bar 38 and moved back into the links 19 to which they belong, the teeth of the racks 16 are engaged with the teeth of the cog wheels 44, and thereby complete a rotation of the wheels 39 proportioned to the travel of the bars 14. As it will be remembered that the bars 14 have been extended with reference to a certain number, and left in such extended position, it will be seen that by resetting that bar to zero the same number of teeth have passed over the cog wheels 44. To illustrate:—If the wheel 39 shown in Fig. 12 of the drawings is in position to expose the numeral 4 in the opening 34, and the bar 14 is advanced so that the numeral 3 on the said bar is alined with the said opening 34, when the wheel 39 is elevated and the teeth in the said wheel 44 engage the bar, the engagement will be between the teeth directly in line with the numeral 4 on the wheel 39 and the numeral 3 on the bar 14. In this position, if the bar 14 be moved back until the teeth of the rack 16 thereon release the teeth of the cog wheel 44, it will be found that the wheel 44 and wheel 39 connected therewith have traveled the distance of three teeth of the wheel 44, presenting at the opening 34 the numeral 7 on the wheel 39, which numeral 7 is the added result of the former number 4 plus the added selected number 3. It will be understood that this rotation of the wheels 39 is effected on each of the wheels 39 independently. It will also be seen that as there are but ten numerals on each wheel, it becomes necessary to carry the total from one wheel to another, as in the usual form of comptometer, but by means of instrumentalities independently operated.

The carrying mechanism employed herein consists of a series of staggered spur carrying wheels 50, equaling in number the wheels 39, and having a double series of spurs in parallel planes divided on the median line of said wheels and in staggered or altered relation. One set of spurs is alined with and disposed in the same plane with the cog wheels 44, and is adapted to engage the teeth of the said wheels to move the said wheels on the happening of certain operations. The said carrying wheels are loosely mounted on a shaft 51, fixedly mounted on and extended between the arms 41, 41, and disposed in parallel relation to the shaft 40. The second series of spurs formed on the said wheels is alined with and extended in the plane of a single toothed extension 52, which is fixedly mounted on the side of each of the wheels 39. The extension 52 is adapted to impinge upon a spur of the wheel 50 at each complete revolution of each of the wheels 39, and when each of the said wheels has rotated to expose the numeral zero under the opening 34 above the said wheel, which is the position when the total of the ten numerals on the said wheel has been employed. The extension 52, when thus moving the carrying wheel 50, places the spur on the opposite side of the median line of the said wheel 50 in engagement with one of the teeth of the cog wheel 44 mounted on the wheel 39 next succeeding in the progressive system of numbering to which this machine is adapted. In this position wherein one of the spurs of the wheel 50 is engaged with the cog wheel 44, a spur of the said wheel 50 is disposed in the path of a tappet extension 53 mounted on the shaft 42. The shaft 42 is revolved one complete revolution when the bars 27 and 38 are returned to their normal position after having set the various bars 14. The carrying wheels 50 are so constructed that when the said tappet extension 53 moves the spur carrying wheel, the spur which was engaged with the cog wheel 44 passes from such engagement, while the spur on the opposite side of the median line next succeeding is placed in the path of the toothed extension 52 to be impinged upon when next the said toothed extension is rotated to move the said spur carrying wheel. Until thus moved by the toothed extension 52 the spur carrying wheel 50 remains quiescent. The shaft 42 is pivotally mounted in the standards 43, 43, and is constructed to rotate in one direction only. Fixedly mounted on the shaft 42, at the one end thereof, is a ratchet wheel 54, engaging the teeth of which is a pawl 55. The pawl 55 is of usual construction, being spring seated and adapted to over-ride the teeth of the ratchet wheel 54 when a gear wheel 56 on which the said ratchet is pivoted is being retracted. Permanently engaged with the teeth of the wheel 56 is a rack extension 57, mounted on a vertical arm 58, and extended therefrom in parallel relation to the arm 45. The wheel 56 is loosely mounted on the shaft 42.

When now the bars 27 and 38, with their connected structural elements, are advanced to reset the bars 14, the extension 57 is carried forward, rotating the wheel 56 backward without disturbing the shaft 42 and tappets 53 thereon, the pawl 55 overrunning the teeth of the ratchet wheel 54. When in the return of the bars 27 and 38, and parts connected therewith, the rack extension 57 reverses the rotation of the wheel 56, the pawl 55 thereon engages the ratchet 54 and rotates the shaft 42. The teeth of the rack 57 and the wheel 56 are equal in number, so that the said shaft 42 is revolved one complete rotation. It is this rotation of the shaft 42 which, as stated, advances any wheel 39 with the teeth of the cog wheel 44 of which the carrying wheel 50 may be engaged. If the carrying wheel is not thus engaged the tappets 53 do not impinge upon the spurs of the said carrying wheels.

In the operation of the invention, numbers of any magnitude are successively added to the registering wheels 39, 39, increasing the total result, and exposing the same after each operation in line with the openings 34, 34. The limit of the total additions is, as stated, varied according to the demand, and by increasing or decreasing the number of wheels 39, 39.

When in the course of operation of the machine the total sum has been acquired and taken off for record, if such be the purpose, it becomes necessary to reset the machine to the initial or zero register. This is accomplished by what is hereinbefore designated as the resetting mechanism. The resetting mechanism consists of a series of cog wheels 59, 59 fixedly mounted upon a shaft 60, which shaft is suitably mounted in bearings in the casing 26, and provided with a milled head 61 on the outside of the machine. The milled head is employed in rotating the shaft 60 and wheels 59 connected therewith. In the normal position of the shaft 40 and the wheels 39 mounted thereon, the cog wheels 44 rest in toothed engagement with the wheels 59, the wheels 39 being supported thereby. The wheels 59 are laterally adjusted with reference to the cog wheels 44 to engage only a half of the face or body of the teeth formed on the said cog wheel. One of the said teeth, to wit, the tooth 62, is mutilated by eliminating the half of the said tooth which would engage the wheel 59. When in the course of the rotation of the cog wheel 44 by the wheel 59 the said wheel 59 is alined with the mutilated tooth 62, it misses engagement, and the cog wheel 44 and wheel 39 connected therewith are brought to an arrested position. In this arrested position the numeral indicating zero on the wheel 39 is alined directly under the opening 34. This operation being repeated until each of the wheels 39 is thus disposed, it will be found that the numeral exposed under each of the openings 34 is the zero numeral. In this position the registering mechanism is reset, and is ready for the succeeding computation. In retracting the bars 27 and 38, and mechanism connected therewith, I employ spiral springs 63, 63, as a preferred form of mechanism for accomplishing this purpose. It will be understood, however, that other means may be employed as a substitute without varying the spirit of the present invention.

What I claim as new and desire to secure by Letters Patent is:

1. An adding machine, comprising a plurality of rotary registering members disposed in alined position; a plurality of reciprocable selective members disposed in parallel arrangement, said selective members having manipulating devices formed thereon in numerical series order; a plurality of transmission mechanisms to operatively connect said registering and selective members when said selective members are arranged in composite order; a conveyer to support said selective members in sliding relation to permit lateral movement of said members on said conveyer; a resetting mechanism arranged to return the said selective members to their initial position; a guide member disposed in parallel arrangement with said manipulating devices and to the right of said registering members, said guide member having an extension toward said registering members adapted to dispose the said selective members in line with the first of said registering members when said manipulating devices are carried to the end of said extension; and a carrying mechanism connecting said registering members to move each of said members one unit space simultaneously with each complete revolution of the adjacent member disposed to the right.

2. An adding machine, comprising a plurality of rotary registering members disposed in alined position; a plurality of reciprocable selective members disposed in parallel arrangement, said selective members having manipulating devices formed thereon in numerical series order; a plurality of transmission mechanisms to operatively connect said registering and selective members when said selective members are arranged in composite order; a conveyer to support said selective members in sliding relation to permit lateral movement of said members on said conveyer; a resetting mechanism arranged to return the said selective members to their initial position; a guide slot having an elongated extension disposed at the right of said registering members and in parallel arrangement with said manipulating devices, said slot having a lateral branch extended toward said registering devices whereby the said selective members are disposed successively in line with the first of said registering members; and a carrying mechanism connecting said registering members to move each of said members one unit space simultaneously with each complete revolution of the adjacent member disposed to the right.

3. An adding machine, comprising a plurality of rotary registering members disposed in alined position; a plurality of reciprocable selective members disposed in parallel arrangement, said selective members having manipulating devices formed thereon in numerical series order; a plurality of transmission mechanisms to operatively connect said registering and selective members when said selective members are arranged in composite order; a conveyer to support said selective members in sliding relation to permit lateral movement of said members on said conveyer; a resetting mechanism arranged to return the said selective members to their initial position; a guide member disposed in parallel arrangement with said manipulating devices and to the right of said registering members, said guide member having an extension toward said registering members adapted to dispose the said selective members in line with the first of said registering members when said manipulating devices are carried to the end of said extension; a carrying mechanism connecting said registering members to move each of said members one unit space simultaneously with each complete revolution of the adjacent member disposed to the right; and a resetting mechanism for said registering devices operable at will for rotating each of said registering members to their initial position.

4. An adding machine, comprising an endless conveyer belt disposed in transverse arrangement; rotary members for supporting said belt; a plurality of selective bars slidably mounted on said belt to be laterally extended therefrom, said bars having a plurality of manipulating devices formed thereon in numerical series order, said manipulating devices on each bar being normally alined on said conveyer; a plurality of rotary registering members disposed in alined position and rotatively mounted in the planes of extension of said bars; and a framing member having a guide slot provided with a vertical extension equal in length to and disposed above said manipulating devices located at the right of said registering members, said slot having a branch extended toward said registering members.

5. An adding machine, comprising an endless conveyer belt disposed in transverse arrangement; rotary members for supporting said belt; a plurality of selective bars slidably mounted on said belt to be laterally extended therefrom, said bars having a plurality of manipulating devices formed thereon in numerical series order, said manipulating devices on each bar being normally alined on said conveyer; a plurality of rotary registering members disposed in alined position and rotatively mounted in the planes of extension of said bars; and a cover for said selective and registering members provided with a guide slot having a vertical extension in line with said manipulating devices, said slot being located to the right of said registering members, and having at the lower end a branch extended toward said registering members, said cover being further provided with openings arranged above said registering members to expose the characters on the periphery thereof when so supplied.

6. An adding machine, comprising a conveyer embodying a plurality of elongated hingedly connected link members; a plurality of selective bars reciprocatively mounted on said link members; a cover for said bars having a guide slot formed therein, said slot being provided with a section extended in parallel disposition with the said bars, and said slot having a branch extended from the lower end thereof to the left a distance equal to one composite space of said machine.

7. An adding machine, comprising an endless belt conveyer; a plurality of selective bars slidably mounted on said belt to be extended laterally therefrom, said bars each provided with wheel engaging devices; a plurality of rotary registering members each having a wheel adapted to operatively engage said selective bars; and means for moving said registering members into engagement with the said selective bars when the latter are extended from said conveyer.

8. An adding machine, comprising an endless belt conveyer; a plurality of selective bars slidably mounted on said conveyer to be extended laterally therefrom, said bars being each provided with a rack toothed member; a plurality of rotary registering members disposed in alined position, and rotatively mounted on a plane parallel to the extension of said selective bars, said members having secured thereon gear toothed wheels adapted to engage the said rack members; and means for moving said wheels to engage said rack members after said bars are extended.

9. An adding machine, comprising an endless belt conveyer; a plurality of selective bars slidably mounted on said conveyer to be extended laterally therefrom, said bars being each provided with a rack toothed member; a plurality of rotary registering members disposed in alined position, and rotatively mounted on a plane parallel to the extension of said selective bars, said members having secured thereon gear toothed wheels adapted to engage the said rack members; means for moving said wheels to engage the said rack members after said bars are extended; and a push bar adapted to be reciprocatively operated to reset said bars on said conveyer after said bars are engaged with said wheels.

10. An adding machine, comprising an endless belt conveyer; a plurality of selective bars slidably mounted on said conveyer to be extended laterally therefrom, said bars being each provided with a rack toothed member; a plurality of rotary registering members disposed in alined position, and rotatively mounted on a plane parallel to the extension of said selective bars, said members having secured thereon gear toothed wheels adapted to engage the said rack members; a push bar adapted to be reciprocatively operated to reset said bars on said conveyer after said bars are engaged with said wheels; and slotted arms connected with said push bar having a sliding connection with said registering members to lift the same into engagement with said rack members at the initiation of the movement of said push bar.

11. An adding machine, embodying a registering mechanism, comprising a plurality of rotary wheels mounted in spaced relation, and provided with display numerals serially arranged on the periphery thereof; a plurality of gear wheels the teeth whereof correspond in number to the said display numerals, one of said wheels being secured to the side of said rotary wheels; a single toothed extension securely mounted on each of said wheels, and on the face thereof adjacent to said gear wheels; a plurality of rotary escapement wheels, each loosely mounted in line with said gear wheels and said single toothed extension, and each of said escapement wheels having alternately arranged spurs disposed in planes on opposite sides of the median line of said escapement wheels; and tappet members mounted on a rotary shaft to extend in the path of said spurs, and arranged to move the same in alternation with said single toothed extension to advance the said registering wheels and reset a spur in the path of said single toothed extension.

In witness whereof, I have affixed my signature, in presence of two witnesses, this 4th day of Feb. 1909.

WILLIAM H. CALLAHAN.

Witnesses:
SARAH E. CLARK,
EMMA S. HESSE.